United States Patent
Cussigh et al.

(10) Patent No.: US 11,846,518 B2
(45) Date of Patent: Dec. 19, 2023

(54) METHOD FOR ROUTE PLANNING IN A NAVIGATION SYSTEM OF A VEHICLE, NAVIGATION SYSTEM FOR A VEHICLE AND VEHICLE HAVING SAID NAVIGATION SYSTEM

(71) Applicant: Bayerische Motoren Werke Aktiengesellschaft, Munich (DE)

(72) Inventors: Maximilian Cussigh, Munich (DE); Harald Hofmeier, Eching (DE); Philipp Kugelmann, Munich (DE); Felix Ruf, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 191 days.

(21) Appl. No.: 17/422,470

(22) PCT Filed: Dec. 17, 2019

(86) PCT No.: PCT/EP2019/085496
§ 371 (c)(1),
(2) Date: Jul. 13, 2021

(87) PCT Pub. No.: WO2020/148051
PCT Pub. Date: Jul. 23, 2020

(65) Prior Publication Data
US 2022/0090928 A1 Mar. 24, 2022

(30) Foreign Application Priority Data
Jan. 16, 2019 (DE) .................. 10 2019 101 094.2

(51) Int. Cl.
*G01C 21/34* (2006.01)
*G01C 21/36* (2006.01)

(52) U.S. Cl.
CPC ..... *G01C 21/3469* (2013.01); *G01C 21/3476* (2013.01); *G01C 21/3492* (2013.01);
(Continued)

(58) Field of Classification Search
CPC ............ G01C 21/3492; G01C 21/3476; G01C 21/3469
See application file for complete search history.

(56) References Cited

U.S. PATENT DOCUMENTS

| 5,790,976 A | 8/1998 | Boll et al. |
| 2011/0224900 A1* | 9/2011 | Hiruta ............... G01C 21/3469 701/533 |

(Continued)

FOREIGN PATENT DOCUMENTS

| CN | 108369103 A | 8/2018 |
| DE | 195 19 107 C1 | 4/1996 |

(Continued)

OTHER PUBLICATIONS

International Search Report (PCT/ISA/210) issued in PCT Application No. PCT/EP2019/085496 dated Apr. 7, 2020 with English translation (four (4) pages).
(Continued)

*Primary Examiner* — Vivek D Koppikar
*Assistant Examiner* — Godfrey Aleksander Maciorowski
(74) *Attorney, Agent, or Firm* — Crowell & Moring LLP

(57) ABSTRACT

A method for route planning includes a) making an initial energy forecast for a journey route to a route destination using an initial speed for at least one section of the journey route. The method may also include: b1) making a first energy forecast for the journey route using a first speed for the at least one section; b2) making a second energy forecast for the journey route using a second speed for the at least one section; b3) determining whether the journey route, based on
(Continued)

the second energy forecast, includes n or n−1 charging stops; and b4) if the journey route includes n charging stops, determining the first speed as specified speed for the at least one section of the journey route, or if the journey route includes n−1 charging stops, repeating steps b2) and b3) with a third speed for the at least one section.

17 Claims, 5 Drawing Sheets

(52) U.S. Cl.
 CPC ..... *G01C 21/3673* (2013.01); *G01C 21/3676* (2013.01); *G01C 21/3679* (2013.01)

(56) References Cited

U.S. PATENT DOCUMENTS

2016/0363456 A1 12/2016 Pujos et al.
2018/0058868 A1 3/2018 Kang et al.
2019/0316924 A1* 10/2019 Morgan-Brown .......................... G01C 21/3697

FOREIGN PATENT DOCUMENTS

| DE | 10 2009 048 821 A1 | | 4/2011 |
|---|---|---|---|
| DE | 102016217087 | * | 9/2016 |
| DE | 10 2016 009 338 A1 | | 2/2017 |
| DE | 10 2016 217 087 A1 | | 3/2018 |
| DE | 10 2017 009 461 A1 | | 3/2018 |
| DE | 10 2017 119 453 A1 | | 3/2018 |
| DE | 10 2016 224 786 A1 | | 6/2018 |
| DE | 10 2017 211 689 A1 | | 1/2019 |
| WO | WO 2016/198674 A1 | | 12/2016 |

OTHER PUBLICATIONS

German-language Written Opinion (PCT/ISA/237) issued in PCT Application No. PCT/EP2019/085496 dated Apr. 7, 2020 (eight (8) pages).
German-language Search Report issued in German Application No. 10 2019 101 094.2 dated Aug. 12, 2019 with an English translation (15 pages).
Chinese-language Office Action issued in Chinese Application No. 201980089156.2 dated Apr. 28, 2023 with English translation (12 pages).

* cited by examiner

METHOD FOR ROUTE PLANNING IN A NAVIGATION SYSTEM OF A VEHICLE, NAVIGATION SYSTEM FOR A VEHICLE AND VEHICLE HAVING SAID NAVIGATION SYSTEM

BACKGROUND AND SUMMARY OF THE INVENTION

The disclosure relates to a method for route planning in a navigation system of a vehicle, in particular an electric vehicle, a navigation system for a vehicle and a vehicle having such a navigation system. The disclosure in particular relates to the optimization of route planning in a navigation system of an electric vehicle.

Navigation systems are generally used in order to recommend a journey route from a current position to a route destination to a driver, the journey route being able to be displayed on a navigation map as a map trail, for example. The journey route can be determined for example on the basis of the shortest time or shortest distance between the current position and the route destination.

Alternatively, energy-optimized journey routes can be ascertained and proposed to the driver. DE 10 2017 119 453 A1 discloses for example a method for producing energy-optimized journey routes using a vehicle navigation system. The method involves producing candidate journey routes between a route starting point and one or more route destinations, and then dividing each candidate journey route into a multiplicity of route sections. The method involves estimating the expected velocities of travel along each section using cloud information and calculating an expected energy efficiency for each of the candidate journey routes using one or more vehicle-specific energy efficiency models. The journey routes are displayed by way of the navigation system.

It is an object of the present disclosure to provide a method for route planning in a navigation system of a vehicle, in particular an electric vehicle, a navigation system for a vehicle and a vehicle having such a navigation system that allow a route destination to be reached more quickly and/or allow more efficient route guidance. In particular, it is an object of the present disclosure to allow destinations to be reached more quickly by minimizing the journey time.

This object is achieved by the subject matter of the claimed invention.

According to embodiments of the present disclosure, a method for route planning in a navigation system of a vehicle, in particular an electric vehicle, is specified. The method comprises:

a) performing an initial energy forecast for a journey route to a route destination using an initial velocity (also referred to as "expected velocity") for at least one section of the journey route;

b) if the journey route comprises n planned charging stops at n charging stations, wherein n is a natural number greater than zero, based on the initial energy forecast then the method further comprises:

b1) performing a first energy forecast for the journey route using a first velocity for the at least one section, which first velocity is lower than the initial velocity, wherein the journey route comprises n−1 planned charging stops at n−1 charging stations for the first velocity;

b2) performing a second energy forecast for the journey route using a second velocity for the at least one section, which second velocity is higher than the first velocity and lower than the initial velocity;

b3) determining whether the journey route comprises n or n−1 charging stops based on the second energy forecast; and b4) if the journey route, based on the second energy forecast, comprises n charging stops, determining the first velocity as setpoint velocity (also referred to as "optimum velocity") for the at least one section of the journey route, comprises n−1 charging stops, repeating steps b2) and b3) with a third velocity for the at least one section, which third velocity is higher than the second velocity and lower than the initial velocity.

According to embodiments of the invention, for a desired route with (a) charging stop(s), given an expected velocity, the velocity is manipulated or changed in order to check whether it is possible to dispense with a charging stop and/or to reach another charging station by way of an adapted velocity. If the result of the check is positive, an optimum velocity can be proposed. The optimum velocity can be ascertained and proposed on a section-by-section basis, i.e. individually for a multiplicity of sections of the journey route, for example. Dispensing with a charging stop and/or reaching another charging station by way of the optimum velocity can allow a reduced traveling time and/or more efficient route guidance. In particular, destinations can be reached more quickly by minimizing the journey time, which can be made up of a traveling time, a charging time and a setup time (preparation and follow-up for the charging process, such as plugging in, paying, etc.). For example, the overall result is that destinations are reached more quickly despite a slower velocity of travel.

The method can use the optimum velocity to actively propose to the driver how he can avoid a stop that is actually required, which results in a load being taken off the driver. Alternatively, the optimum velocity can be automatically adopted as the velocity of travel from a driving assistance system in the case of automated driving. A cost advantage can also arise as a result of dispensing with the charging stop and/or as a result of the more efficient route. In addition, the adapted velocity can ensure that destinations are reached as quickly as possible.

In some embodiments, a multiplicity of possible velocity profiles for the journey route can be examined by way of the method of the present disclosure, which results in a multiplicity of solutions for optimum (e.g. on a section-by-section basis) velocities and/or charging stations along the route. A forecast probability can be taken into consideration for a suitable selection of one or more solutions from the multiplicity of solutions. The forecast probability can indicate a probability of a respective velocity profile. In particular, some velocity profiles may be more probable than others. Preferably, one or more solutions that are most probable can then be proposed. Improbable solutions can be rejected. For example, there may be multiple equivalent solutions available (e.g. identical journey time for two alternative charging stations), the more probable solution being able to be proposed and the less probable solution rejected.

Preferably, the method comprises outputting a journey time to the route destination on the basis of the setpoint velocity for the at least one section of the journey route.

Preferably, the method further comprises outputting the setpoint velocity to a driver and/or an automated driving function. In particular, the setpoint velocity can be ascertained and output on a section-by-section basis for the route to the route destination, such as for example to a driver or an automated driving function. For example, the setpoint velocity can be displayed on a display and/or can be output by voice output. The output of the setpoint velocity to the driver in this case is a recommendation or a proposal for an optimum velocity.

Preferably, the setpoint velocity is ascertained and output continually over the journey duration. The setpoint velocity can thus be continuously adapted for the real energy consumption, for example if the driver does not keep to the velocity proposal and/or if the forecast energy consumption deviates from the actual energy consumption.

Preferably, the method further comprises, if the journey route comprises n−1 charging stops (i.e. if at least one initially planned charging stop can potentially be dispensed with) based on the second energy forecast, repeating steps b2) and b3) m times, wherein m is a natural number greater than zero, and wherein the respective energy forecasts of repeated step b2) are performed with gradually increased velocity. For example, m indicates an iteration i (where i=1 . . . m) of steps b2) and b3). The journey route can comprise the original number of n charging stops for the m-th iteration. i=m−1 can indicate an iteration i of steps b2) and b3) for which the journey route comprises n−1 charging stops. The method can further comprise determining a velocity of the iteration i=m−1 of steps b2) and b3) as setpoint velocity for the at least one section of the journey route.

This means that the velocity is increased until the charging stop initially dispensed with is required again. The velocity of the last iteration for which this additional charging stop is not (yet) required is determined and output as the setpoint velocity. In other words, the maximum velocity (still) possible when a charging stop is dispensed with can be determined.

Preferably, the method further comprises determining the initial velocity from realtime traffic information. The initial velocity can in particular be an expected (on a section-by-section basis) velocity that can be obtained by way of the realtime traffic information, for example. The realtime traffic information can be "Real Time Traffic Information" (RTTI) from BMW, for example. The initial velocity, which is an input variable for the energy forecast, is manipulated according to the present disclosure in order to determine an optimum (e.g. on a section-by-section basis) velocity.

Preferably, the route comprises two or more successive sections. The two or more successive sections can be separated by the charging station(s). In some embodiments, the setpoint velocity can be determined individually for each section of the two or more successive sections. In particular, the setpoint velocity can be determined and output repeatedly, and in particular continuously, for each section of the two or more successive sections over the course of the route. This can allow adaptive matching of the velocity proposal to the real energy consumption during the journey.

Preferably, step b) is performed for the n charging stations that form a first set of charging stations. The method can further comprise replacing at least one charging station of the n charging stations of the first set with a charging station that is not contained in the first set, in order to form a second set of charging stations, and performing step b) for the n charging stations of the second set of charging stations. In particular, it is possible to check whether other charging stations allow a reduced traveling time and/or more efficient route guidance.

Preferably, the method further comprises outputting a first journey time to the route destination for the first set of charging stations and outputting a second journey time to the route destination for the second set of charging stations. This allows multiple options to be displayed to the driver, from which he can select a preferred option. In the case of an automated driving function, the driver can likewise select the preferred option, which the automated driving function or the driving assistance system can adopt for the route guidance.

Preferably, the method further comprises a user stipulating at least one charging station of the n charging stations. The user can stipulate a charging station for the route, for example, the iterative method according to the present disclosure being able to determine the setpoint velocity (velocities) on the basis of this specification. In particular, the method according to the present disclosure can check whether another charging station allows a reduced traveling time and/or more efficient route guidance (e.g. as a result of a more efficient or more powerful charging station). Multiple options can then be displayed to the driver, such as for example by outputting the first journey time to the route destination for the specified charging station(s) and the second journey time to the route destination for the alternative charging station(s).

Preferably, the method further comprises e.g. the driver specifying a target state at the route destination. The target state can be for example a (desired) remaining range ("RRW") at the route destination or a remaining state of charge ("remaining SoC") of a drive energy store of an electric vehicle. The energy forecasts, and in particular the initial energy forecast, the first energy forecast and the second energy forecast, can be produced by taking into consideration the specified target state. For example, adaptive matching of the velocity proposal to the real consumption during the journey can be made possible in order to ensure that destinations are reached with the desired state.

According to a further aspect of the present disclosure, a storage medium is described. The storage medium can comprise a software program that is set up to be executed on a processor, and thereby to perform the method described in this document for route planning in a navigation system of a vehicle.

According to a further aspect of the present disclosure, a navigation system for a vehicle is specified. The navigation system comprises at least one processor that is set up to perform the method described in this document for route planning in a navigation system of a vehicle.

In some embodiments, the navigation system can comprise at least one output unit that is set up to output the journey route and/or the determined setpoint velocity. The at least one output unit can comprise a visual output unit, such as for example a display for displaying a navigation map with a map trail, and/or an audible output unit for outputting voice instructions.

According to a further aspect of the present disclosure, a vehicle, in particular an electric vehicle, comprising the aforementioned navigation system is specified.

According to embodiments, the electric vehicle can be a pure electric vehicle. However, the present disclosure is not restricted thereto and the vehicle can be a hybrid vehicle, such as a plug-in hybrid vehicle (PHEV). The term vehicle covers passenger vehicles, trucks, buses, motorhomes, motorcycles, etc., used for conveying people, goods, etc. In particular, the term covers motor vehicles for conveying people.

The vehicle can comprise a driving assistance system for automated driving. Within the context of the document, the term "automated driving" can be understood to mean driving with automated longitudinal or transverse guidance or autonomous driving with automated longitudinal and transverse guidance. Automated driving can be for example driving for a relatively long time on the freeway or driving for a limited time while parking or maneuvering. The term "automated driving" covers automated driving with an arbitrary level of automation. Illustrative levels of automation are assisted, semiautomated, highly automated or fully automated driving. These levels of automation were defined by the German Federal Highway Research Institute (BASt) (see BASt publication "Forschung kompakt", issue November 2012).

In the case of assisted driving, the driver performs the longitudinal or transverse guidance on an ongoing basis, while the system undertakes the respective other function within certain boundaries. In the case of semiautomated driving (TAF), the system undertakes the longitudinal and transverse guidance for a certain period of time and/or in specific situations, the driver needing to monitor the system on an ongoing basis as in the case of assisted driving. In the case of highly automated driving (HAF), the system undertakes the longitudinal and transverse guidance for a certain period of time without the driver needing to monitor the system on an ongoing basis; however, the driver must be capable of taking over vehicle guidance within a certain time. In the case of fully automated driving (VAF), the system can automatically cope with driving in all situations for a specific application; a driver is no longer needed for this application.

The aforementioned four levels of automation correspond to SAE levels 1 to 4 of SAE standard J3016 (SAE—Society of Automotive Engineering). By way of example, highly automated driving (HAF) corresponds to level 3 of SAE standard J3016. Furthermore, SAE standard J3016 also has provision for SAE level 5 as the highest level of automation, which is not included in the definition from the BASt. SAE level 5 corresponds to driverless driving, in which the system can automatically cope with all situations throughout the entire journey in the same way as a human driver; a driver is generally no longer needed.

Exemplary embodiments of the disclosure are depicted in the figures and are described in more detail below.

DETAILED DESCRIPTION OF THE DRAWINGS

Unless stated otherwise, identical reference signs are used below for identical and identically acting elements.

Figure 1:
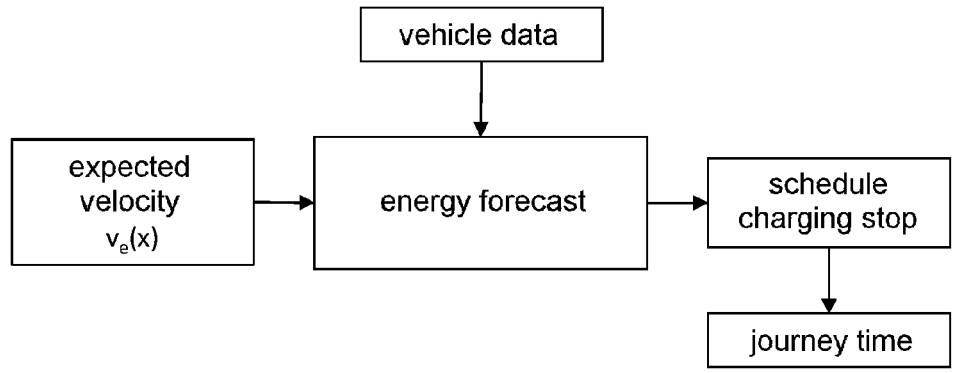
FIG. 1 schematically shows an energy forecast for a vehicle according to embodiments of the present disclosure.

FIG. 1 schematically shows an energy forecast for a route for a vehicle according to embodiments of the present disclosure.

The vehicle can be an electric vehicle. The electric vehicle comprises an electrical energy store (e.g. batteries) that can be connected to a charging station and charged. Various charging technologies can be used for charging the electrical energy stores of such electric vehicles. In the case of AC charging, the charger that converts the DC current for charging the electrical energy store is located in the vehicle. In the case of DC charging, the charger that converts the DC current for charging the electrical energy store is located in the charging station.

For an energy forecast for a route destination, which can be input into the navigation system by a user, for example, the expected energy requirement of the vehicle as far as the route destination is ascertained. The expected energy requirement can in particular be provided using an expected velocity. The expected velocity may be available on a section-by-section basis, i.e. the expected velocity can vary over the course of the route. The expected velocity can be obtained by way of realtime traffic information, for example. The realtime traffic information can be "Real Time Traffic Information" (RTTI) from BMW, for example.

Typically, further parameters can be used for the energy forecast, such as for example vehicle data. The vehicle data can include for example a state of charge (SoC) of a drive energy store, a remaining range, a loading state of the vehicle, a driver profile (e.g. a driver-specific consumption), a gradient, a remaining distance, etc.

The probable journey time to the route destination can be ascertained and displayed to the driver. Moreover, the energy forecast can be taken as a basis for scheduling at least one charging stop in the route planning. If the stock of energy or the remaining range based on the known data, such as for example the expected velocity from the realtime traffic information, is not enough for the route destination, at least one charging stop at an appropriate charging station can be scheduled along the route.

The energy forecast can be provided on a section-by-section basis. In particular, the route can be divided into multiple sections for which for example a respective expected velocity $v_e(x)$ is available. The energy requirement of the individual sections can be summed in order to obtain the total energy requirement for the route destination.

The present disclosure allows a reduced traveling time and more efficient route guidance. The reduced journey time can be achieved by dispensing with a charging stop, as explained with reference to FIG. 2, for example. The more efficient route guidance can be achieved by determining cheaper charging stations, as explained with reference to FIG. 3, for example.

Figure 2:
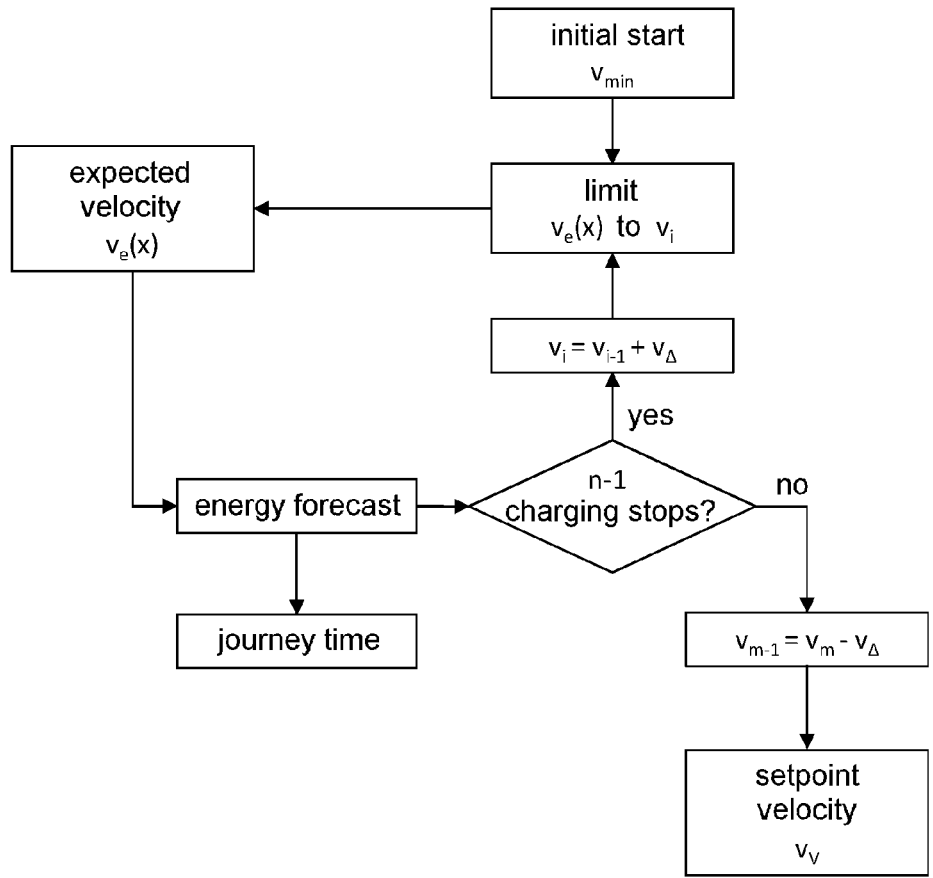
FIG. 2 schematically shows a flowchart for a method for route planning in a navigation system of a vehicle according to embodiments of the present disclosure.

FIG. 2 shows a flowchart for a method for route planning in a navigation system of a vehicle, in particular an electric vehicle, according to embodiments of the present disclosure.

The method can first of all perform an original routing with an initial velocity (e.g. the expected velocity $v_e(x)$ from realtime traffic information), as depicted in FIG. 1. The original routing can comprise no charging stops (n=0) or at least one charging stop (n>0 or n≥1).

No charging stops (n=0)

If there are no charging stops (n=0) in the original routing, a new solution is not obtained. In other words, a charging stop cannot be dispensed with, since none is planned. In such a case, the initial velocity from the realtime traffic information can be stipulated and output as setpoint velocity $v_V$.

At least one charging stop (n>0 or n≥1)

If the original routing contains at least one charging stop (n>0 or n≥1), the expected velocity $v_e(x)$ is manipulated.

To this end, a first energy forecast for the journey route is first of all performed using a first velocity $v_{min}$ for the at least one section, which first velocity is lower than the initial velocity. The first velocity $v_{min}$ can be a minimally defined velocity that is used to first of all check whether a charging stop can theoretically be avoided. For example, an expected velocity profile can be limited to this minimum velocity. The first velocity $v_{min}$ can be stipulated in a suitable fashion, such as for example at 110 km/h or lower (e.g. for freeway journeys) or at 40 km/h or lower (e.g. for town journeys). No charging stops dispensed with at $v_{min}$ If a charging stop cannot be dispensed with at the first velocity $v_{min}$, a new solution is not obtained. In other words, a charging stop cannot be dispensed with by reducing the velocity to a realistic extent. In such a case, the initial velocity from the realtime traffic information can be stipulated and output as setpoint velocity $v_V$.

At least one charging stop dispensed with at $v_{min}$

If it is determined that at least one charging stop can be dispensed with at the first velocity $v_{min}$, the expected velocity $v_e(x)$ used for the energy forecast is gradually increased by $\Delta v(v_e(x)=v_i=v_{i-1}+\Delta v; v_{i-1}(i=1)=v_0=v_{min})$ until the charging stop initially dispensed with is required again. In particular, the energy forecast for the journey route is iteratively repeated with the manipulated velocity $v_i$. The step size can be chosen in a suitable fashion, e.g. $\Delta v=1$ km/h.

In particular, the energy forecast for the journey route with the manipulated velocity is repeated m times (i.e. i=1 ... m iterations, wherein i is a control variable and m is an integer greater than zero), in order to determine a setpoint velocity at which a charging stop can be dispensed with completely. The setpoint velocity $v_V$ is also referred to as "velocity proposal" or "optimum velocity" below.

In detail, if the journey route comprises a number of n−1 charging stops for the first velocity $v_{min}$, a second energy forecast for the journey route using a second velocity for the at least one section, which second velocity is higher than the first velocity $v_{min}$ and lower than the initial velocity, can be performed. This is the first iteration i=1, the second velocity being able to be provided by $v_{i=1}=v_0+\Delta v$.

If the journey route comprises n charging stops based on the second energy forecast, the first velocity is determined as setpoint velocity for the at least one section of the journey route. If the journey route comprises n−1 charging stops based on the second energy forecast, however, then the method is repeated with a third velocity for the at least one section, which third velocity is higher than the second velocity and lower than the initial velocity. This is the second iteration i=2, the third velocity being able to be provided by $v_{i=2}=v_{i-1}+\Delta v$.

In particular, the method comprises, if the journey route comprises n−1 charging stops (i.e. if at least one initially planned charging stop can be dispensed with) based on the second energy forecast, repeating the energy forecast m times with gradually increased velocities $v_i$. For example, m indicates an iteration i for which the journey route comprises n charging stops, and m−1 indicates an iteration i for which the journey route comprises n−1 charging stops. The method can further comprise determining a velocity of the iteration m−1 setpoint velocity for the at least one section of the journey route.

This means that the velocity is increased by $\Delta v$ until the charging stop initially dispensed with is required again. The velocity of the last iteration for which this additional charging stop is not (yet) required is determined as the setpoint velocity. In other words, the maximum velocity (still) possible when the charging stop is dispensed with can be determined.

In some embodiments, a remaining journey time to the route destination based on the determined setpoint velocity for the at least one section of the journey route can be output e.g. visually on a display of the vehicle and/or verbally by way of loudspeaker in the vehicle.

In some embodiments, the setpoint velocity can be output to a driver and/or an automated driving function. In particular, the setpoint velocity can be ascertained and output on a section-by-section basis for the route to the route destination, such as for example to a driver or an automated driving function. For example, the setpoint velocity can be displayed on a display of the vehicle and/or can be output by voice output. The output of the setpoint velocity to the driver in this case is a recommendation or a proposal for an optimum velocity.

Typically, the setpoint velocity is ascertained and output continually over the journey duration or the route. The setpoint velocity can thus be continuously adapted for the real energy consumption, for example if the driver does not keep to the velocity proposal and/or if the forecast energy consumption deviates from the actual energy consumption.

In some embodiments, the method further comprises e.g. the driver specifying a target state at the route destination. The target state can be for example a (desired) remaining range at the route destination or a remaining state of charge ("remaining SoC") of a drive energy store of an electric vehicle. The energy forecasts, and in particular the initial energy forecast, the first energy forecast and the second energy forecast, can be produced by taking into consideration the specified target state. For example, this allows adaptive matching of the velocity proposal to the real consumption during the journey in order to ensure that destinations are reached with the desired state.

In some embodiments, a multiplicity of possible velocity profiles for the journey route can be examined by way of the algorithm depicted above, which results in a multiplicity of solutions for optimum (e.g. on a section-by-section basis) velocities and/or charging stations along the route. A forecast probability can be taken into consideration for a suitable selection of one or more solutions from the multiplicity of solutions. In particular, some velocity profiles may be more probable than others. Preferably, one or more solutions that are most probable can then be proposed. Improbable solutions can be rejected. For example, there may be multiple equivalent solutions available (e.g. identical journey time for two alternative charging stations), the more probable solution being able to be proposed and the less probable solution rejected.

Figure 3:
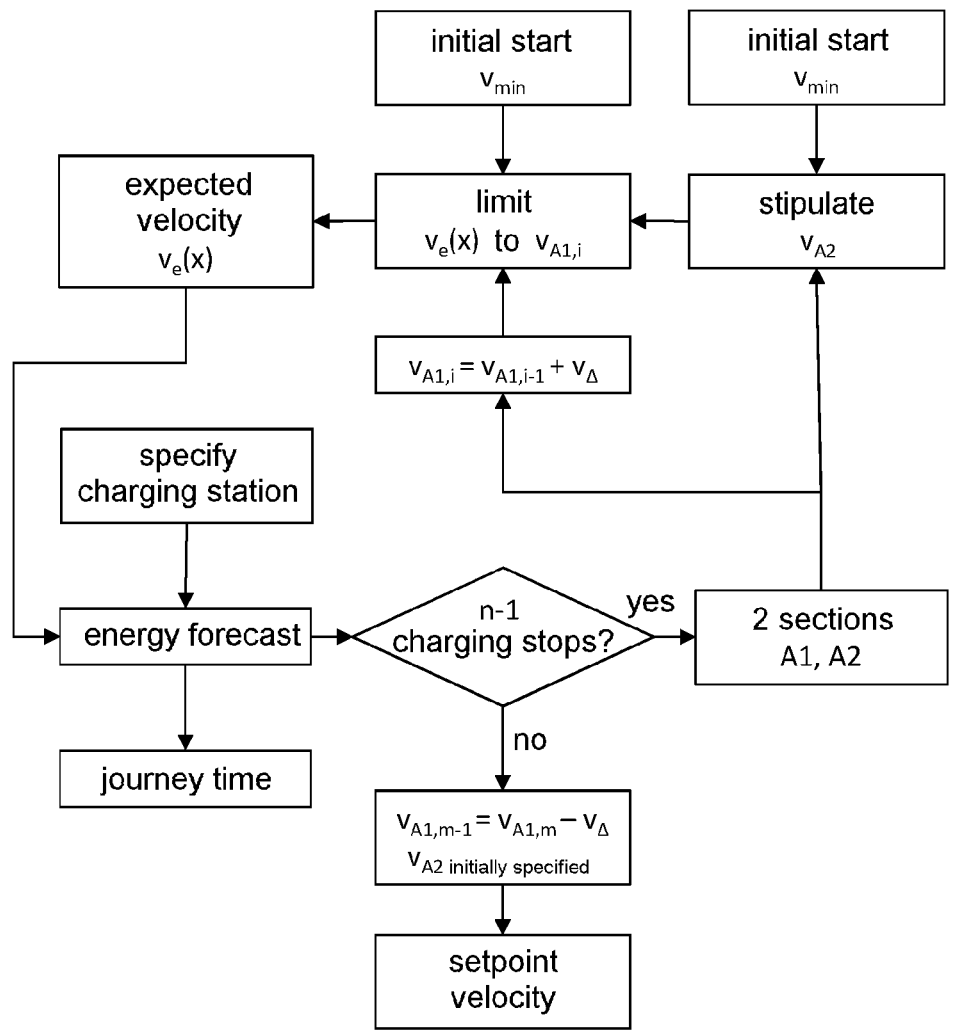
FIG. 3 schematically shows a flowchart for a method for route planning in a navigation system of a vehicle according to further embodiments of the present disclosure.

FIG. 3 schematically shows a flowchart for a method for route planning in a navigation system of a vehicle, in particular an electric vehicle, according to further embodiments of the present disclosure. The method in FIG. 3 is similar to the method shown in FIG. 2, and similar or identical aspects are not repeated below.

In some embodiments, the journey route can be divided into two or more successive sections. The two or more successive sections can be separated by the charging station(s). The energy forecast for the journey route can be produced by combining the individual sections. In some embodiments, the setpoint velocity can be determined individually for each section of the two or more successive sections. For example, the setpoint velocity for each of the two or more successive sections can be determined by way of the iterative method of the present disclosure. In a further example, a setpoint velocity for at least one section of the two or more successive sections of the journey route can be stipulated in advance, for example by a user, as shown in FIG. 3.

In the example of FIG. 3, the route comprises two successive sections A1 and A2. The setpoint velocity $v_{A1,m-1}$ for a first section A1 of the two successive sections is determined by the iterative method of the present disclosure. The setpoint velocity $v_{A2}$ for a second section A2 of the two successive sections can be stipulated in advance, for example by a user or other constraints.

In some embodiments, the iterative method of the present disclosure can be used to determine other charging stations than the charging stations initially scheduled in the original route planning. The other charging stations can be faster and/or better charging stations, for example. To this end, at least one other relevant charging station can first of all be defined, the maximum possible velocity for the subsections produced being sought for each charging station. The solution that is output can be the route with defined charging stations and velocity proposals for each section.

In detail, the n initial charging stations can form a first set of charging stations. At least one charging station of the n initial charging stations of the first set can be replaced by a charging station that is not contained in the first set, in order to form a second set of charging stations. The iterative method of the present disclosure can be performed for the n charging stations of the second set of charging stations in order to check whether other charging stations allow a reduced traveling time and/or more efficient route guidance.

Typically, the method further comprises outputting a first journey time to the route destination for the first set of charging stations and outputting a second journey time to the route destination for the second set of charging stations. Multiple options can be displayed to the driver, from which he can select a preferred option. In the case of an automated driving function, the driver can likewise select the preferred option, which the automated driving function can adopt.

At least one charging station of the n charging stations can be stipulated by a user. The user can stipulate a charging station for the route, for example, the method according to the present disclosure being able to check whether another charging station allows a reduced traveling time and/or more efficient route guidance (e.g. as a result of a more efficient or more powerful charging station). Multiple options can then be displayed to the driver, such as for example by outputting the first journey time to the route destination for the specified charging station(s) and the second journey time to the route destination for the alternative charging station(s).

Figure 4:
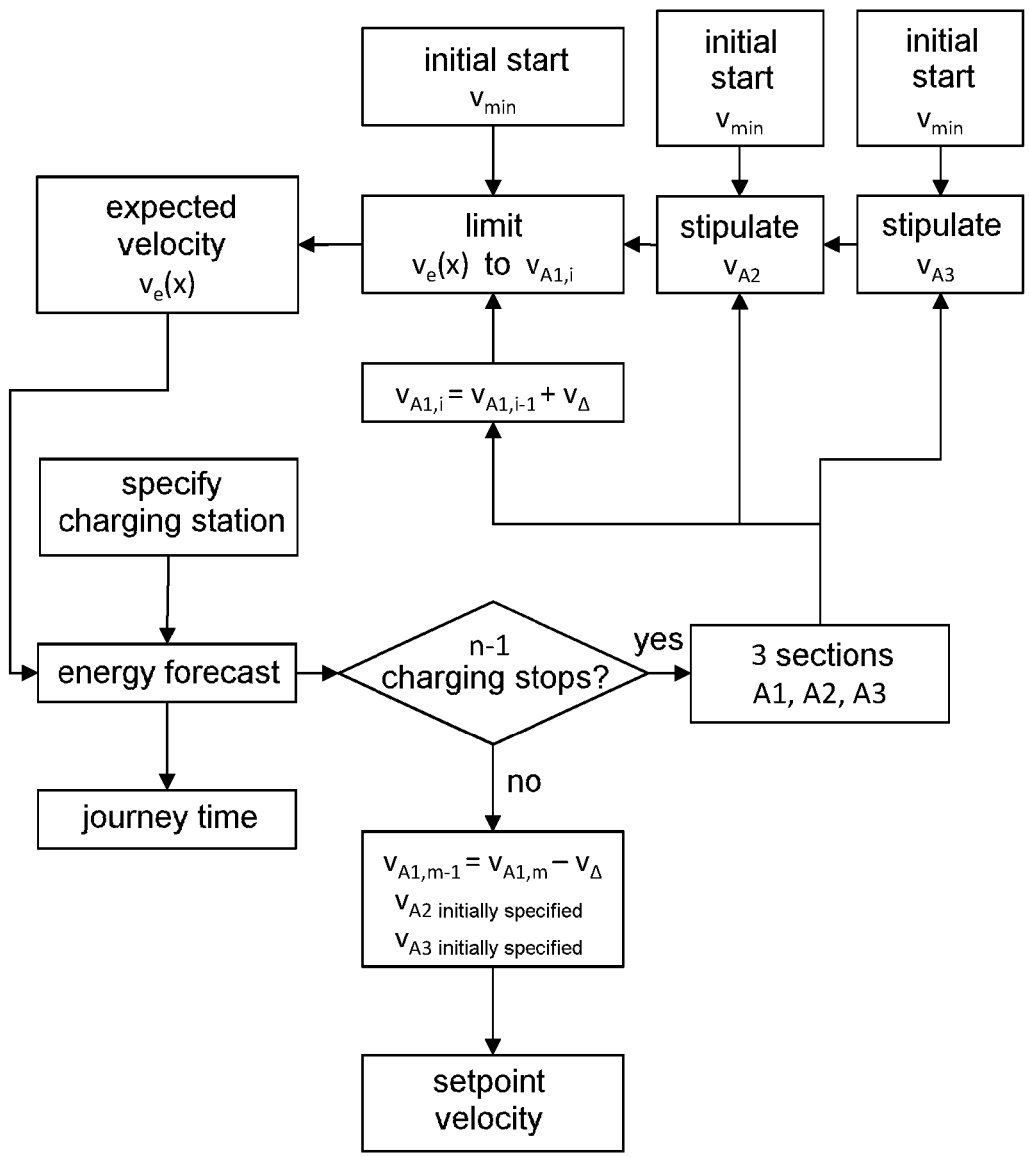
FIG. 4 schematically shows a flowchart for a method for route planning in a navigation system of a vehicle according to yet further embodiments of the present disclosure.

FIG. 4 schematically shows a flowchart for a method for route planning in a navigation system of a vehicle, in particular an electric vehicle, according to further embodiments of the present disclosure.

The method in FIG. 4 is similar to the method depicted in FIG. 3, and similar or identical aspects are not repeated below. In FIG. 4, the route is divided into three sections A1, A2 and A3, which may be defined by two charging stops.

The setpoint velocity $v_{A1,m-1}$ for a first section A1 of the two successive sections is determined by the iterative method of the present disclosure. The setpoint velocities $v_{A2}$ and $v_{A3}$ for a second section A2 and a third section A3 of the two successive sections can be stipulated in advance, for example by a user or other constraints.

FIGS. 5 to 8 show the iterative method during the journey to the route destination with adaptation for the actual energy consumption.

In some embodiments, the setpoint velocity is ascertained and output continually over the journey duration. The setpoint velocity can thus be continuously adapted for the real energy consumption, for example if the driver does not keep to the velocity proposal and/or if the forecast energy consumption deviates from the actual energy consumption.

Figure 5:
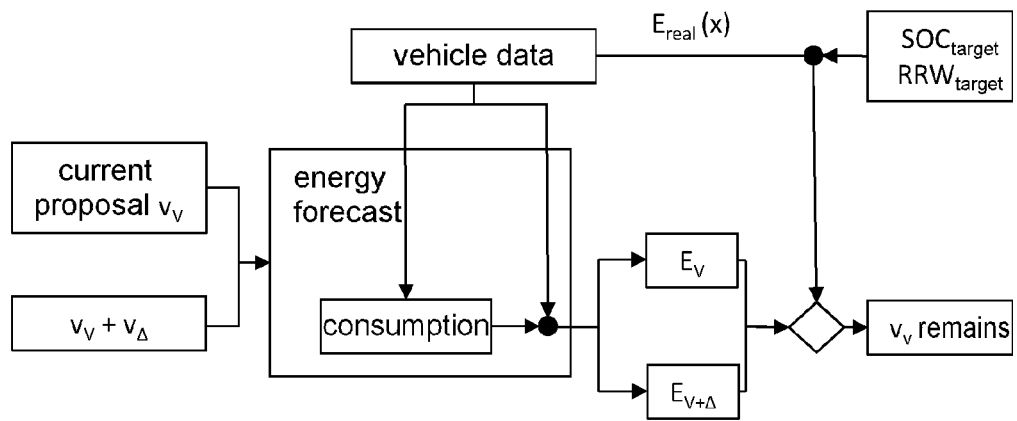
FIGS. 5 to 7 show the iterative method during the journey to the route destination with adaptation for the actual energy consumption.

In FIG. 5, the actual consumption is as forecast and the real energy consumption $E_{real}$ is between an energy consumption $E_v$ (corresponding to the originally ascertained velocity proposal $v_V$) and an increased energy consumption $E_{v+\Delta}$ (corresponding to the originally ascertained velocity proposal $v_V$ plus $\Delta v$). In this case, the velocity proposal $v_V$ can remain unchanged.

Figure 6:
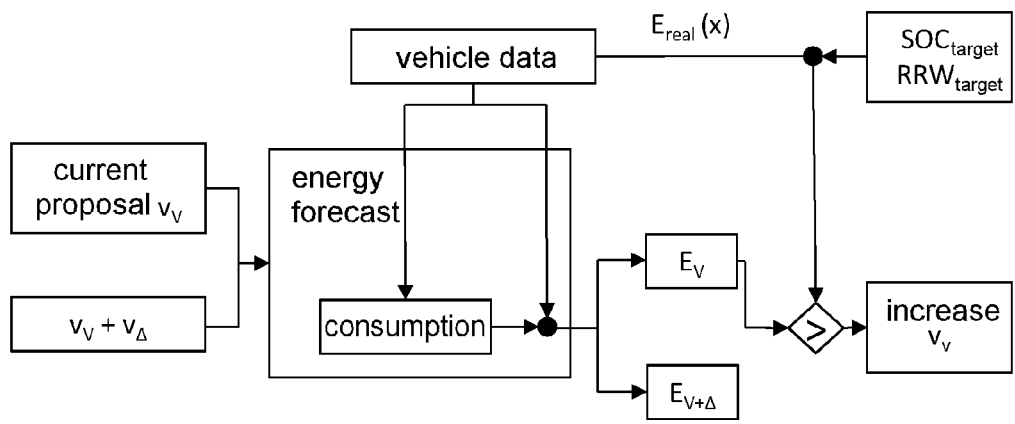

In FIG. 6, the real energy consumption $E_{real}$ is below the lower limit $E_v$ and a new calculation of the forecast energy consumption curves takes place. In this case, the velocity proposal $v_V$ can be increased.

Figure 7:
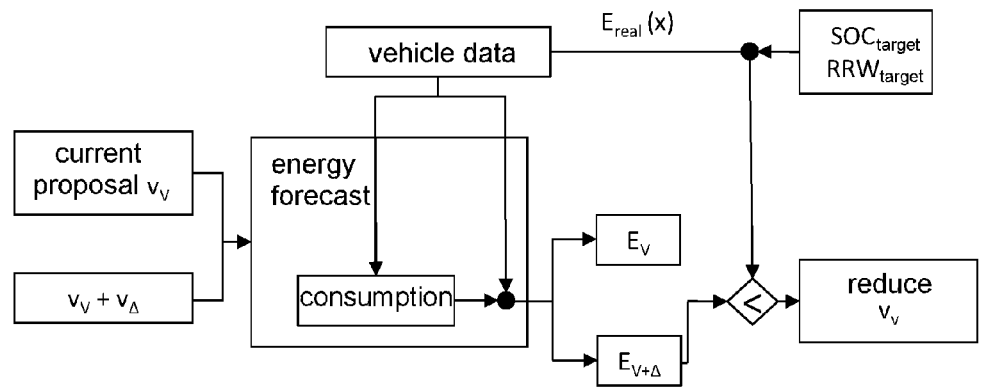
Figure 8:
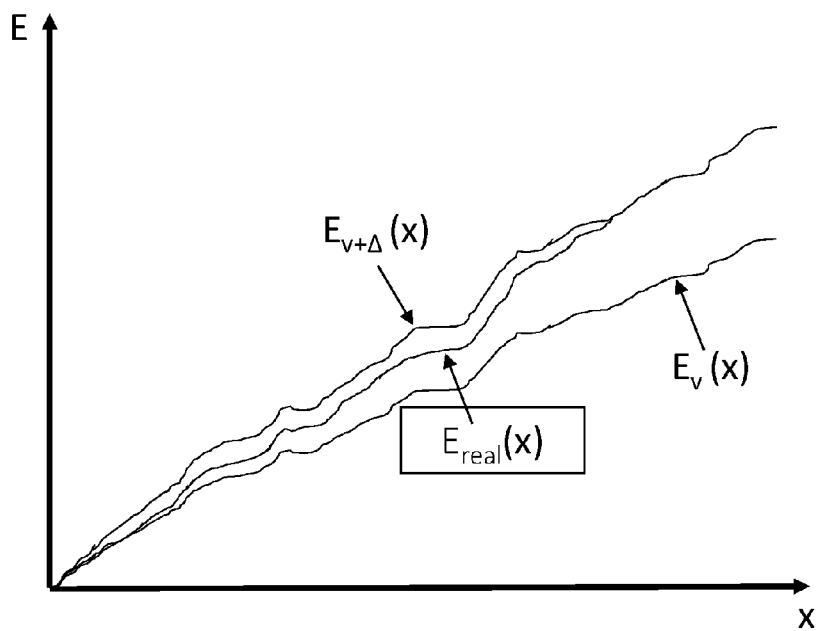
FIG. 8 shows adaptation of the velocity proposal for the actual energy consumption.

In FIG. 7, the real energy consumption $E_{real}$ is above the lower limit $E_v$ and a new calculation of the forecast energy consumption curves takes place. In this case, the velocity proposal $v_V$ can be reduced. This is likewise depicted in FIG. 8 at the point of contact between the real consumption $E_{real}$ and the increased energy consumption $E_{v+\Delta}$.

According to embodiments of the invention, for a desired route with (a) charging stop(s), given an expected velocity, the velocity is manipulated or changed in order to check whether it is possible to dispense with a charging stop and/or to reach another charging station by way of an adapted velocity. If the result of the check is positive, an optimum velocity can be proposed. The optimum velocity can be ascertained and proposed on a section-by-section basis, i.e. individually for a multiplicity of sections of the journey route, for example. The optimum velocity can allow a reduced traveling time and/or more efficient route guidance.

The method can use the optimum velocity to actively propose to the driver how he can avoid a stop that is actually required, which results in a load being taken off the driver. Alternatively, the optimum velocity can be automatically adopted as the velocity of travel from a driving assistance system in the case of automated driving. A cost advantage can also arise as a result of dispensing with the charging stop and/or as a result of the more efficient route. In addition, the adapted velocity can ensure that destinations are reached as quickly as possible.

What is claimed is:

1. A method for route planning in a navigation system of a vehicle, the method comprising:
   a) performing an initial energy forecast for a journey route to a route destination using an initial velocity for at least one section of the journey route;
   b) upon determining, based on the initial energy forecast, that the journey route comprises n planned charging stops at n charging stations, wherein n is a natural number greater than zero:
      b1) performing a first energy forecast for the journey route using a first velocity for the at least one section, wherein the first velocity is lower than the initial velocity, and the journey route comprises n−1 planned charging stops at n−1 charging stations for the first velocity;
      b2) performing a second energy forecast for the journey route using a second velocity for the at least one section, wherein the second velocity is higher than the first velocity and lower than the initial velocity;
      b3) determining whether the journey route comprises n or n−1 charging stops based on the second energy forecast;

b4) upon determining, based on the second energy forecast, that the journey route comprises n charging stops, determining the first velocity as setpoint velocity for the at least one section of the journey route; or upon determining, based on the second energy forecast, that the journey route comprises n−1 charging stops, repeating steps b2) and b3) with a third velocity for the at least one section, wherein the third velocity is higher than the second velocity and lower than the initial velocity; and c) operating the vehicle at the setpoint velocity.

2. The method according to claim 1, further comprising: outputting a journey time to the route destination on the basis of the setpoint velocity for the at least one section of the journey route.

3. The method according to claim 1, further comprising: upon determining, based on the second energy forecast, that the journey route comprises n−1 charging stops, repeating steps b2) and b3) m times, wherein m is a natural number greater than zero, and wherein the respective energy forecasts of repeated step b2) are performed with gradually increasing velocity.

4. The method according to claim 3, wherein m indicates an iteration of steps b2) and b3) for which the journey route comprises n charging stops, wherein m−1 indicates an iteration of steps b2) and b3) for which the journey route comprises n−1 charging stops, and wherein the method further comprises:

determining a velocity of the iteration m−1 of steps b2) and b3) as the setpoint velocity for the at least one section of the journey route.

5. The method according to claim 1, further comprising: determining the initial velocity from realtime traffic information.

6. The method according to claim 1, wherein the journey route comprises two or more successive sections that are separated by the charging stations.

7. The method according to claim 6, wherein the setpoint velocity is determined individually for each section of the two or more successive sections.

8. The method according to claim 1, wherein step b) is performed for the n charging stations that form a first set of charging stations, and wherein the method further comprises:

replacing at least one charging station of the n charging stations of the first set with a charging station that is not contained in the first set, in order to form a second set of charging stations; and performing step b) for the n charging stations of the second set of charging stations.

9. The method according to claim 8, further comprising: outputting a first journey time to the route destination for the first set of charging stations; and outputting a second journey time to the route destination for the second set of charging stations.

10. The method according to claim 1, further comprising: stipulating, by a user, at least one charging station of the n charging stations.

11. The method according to claim 1, further comprising: receiving a user input for stipulating a target state at the route destination, wherein the target state is selected from the group consisting of a remaining range at the route destination and a remaining state of charge of a drive energy store.

12. The method according to claim 1, wherein the vehicle is an electric vehicle.

13. A computer product comprising a non-transitory computer readable medium having stored thereon program code which, when executed on a processor, carries out the acts of:

a) performing an initial energy forecast for a journey route to a route destination using an initial velocity for at least one section of the journey route;

b) upon determining, based on the initial energy forecast, that the journey route comprises n planned charging stops at n charging stations, wherein n is a natural number greater than zero:

b1) performing a first energy forecast for the journey route using a first velocity for the at least one section, wherein the first velocity is lower than the initial velocity, and the journey route comprises n−1 planned charging stops at n−1 charging stations for the first velocity;

b2) performing a second energy forecast for the journey route using a second velocity for the at least one section, wherein the second velocity is higher than the first velocity and lower than the initial velocity;

b3) determining whether the journey route comprises n or n−1 charging stops based on the second energy forecast;

b4) upon determining, based on the second energy forecast, that the journey route comprises n charging stops, determining the first velocity as setpoint velocity for the at least one section of the journey route; or upon determining, based on the second energy forecast, that the journey route comprises n−1 charging stops, repeating steps b2) and b3) with a third velocity for the at least one section, wherein the third velocity is higher than the second velocity and lower than the initial velocity; and c) operating the vehicle at the setpoint velocity.

14. A navigation system for a vehicle, the navigation system comprising the computer product according to claim 13.

15. A vehicle comprising the navigation system according to claim 14.

16. The vehicle according to claim 15, wherein the vehicle is an electric vehicle.

17. The method according to claim 1, further comprising outputting the setpoint velocity to at least one of a driver of the vehicle or an automated driving function of the vehicle.

* * * * *